(12) United States Patent
Rankin et al.

(10) Patent No.: US 7,958,607 B2
(45) Date of Patent: Jun. 14, 2011

(54) DOUBLE ENDED PEG

(76) Inventors: Ian Rankin, South Fremantle (AU);
Rochelle Rankin, South Fremantle (AU); Mark Strickland, Mosman Park (AU); Miranda Strickland, Mosman Park (AU)

( * ) Notice: Subject to any disclaimer, the term of this patent is extended or adjusted under 35 U.S.C. 154(b) by 771 days.

(21) Appl. No.: 11/658,946

(22) PCT Filed: Jul. 29, 2005

(86) PCT No.: PCT/AU2005/001115
§ 371 (c)(1),
(2), (4) Date: Jan. 29, 2007

(87) PCT Pub. No.: WO2006/010219
PCT Pub. Date: Feb. 2, 2006

(65) Prior Publication Data
US 2008/0244880 A1    Oct. 9, 2008

(30) Foreign Application Priority Data

Jul. 30, 2004    (AU) ................................ 2004904245

(51) Int. Cl.
*A44B 21/00*    (2006.01)
*D06F 55/02*    (2006.01)
(52) U.S. Cl. ................. 24/335; 24/336; 24/338; 24/501
(58) Field of Classification Search .................... 24/335, 24/336, 338, 501, 564, 511, 504, 499
See application file for complete search history.

(56) References Cited

U.S. PATENT DOCUMENTS 609,198 A * 8/1898 Graves ............................ 24/564
(Continued)

FOREIGN PATENT DOCUMENTS

FR    1025334    9/1950
(Continued)

*Primary Examiner* — Daniel P Stodola
*Assistant Examiner* — Rowland D Do
(74) *Attorney, Agent, or Firm* — Renner, Kenner, Greive, Bobak, Taylor & Weber (57) ABSTRACT

In accordance with the present invention, there is provided a fastener with a first end and a second end, the fastener including a first member, a second member and biasing means, at least a first portion of the basing means being substantially parallel to at least a portion of the first member and at least a second portion of the basing means being substantially parallel to the at least a portion of the second member, the first and second members relatively pivotable at a first fulcrum intermediate the first and second ends and at a second fulcrum intermediate the first and second ends wherein the first fulcrum and the second fulcrum are spaced apart relative to each other, jaws located between the first fulcrum and the second fulcrum, a first handle at the first end of the fastener and a second handle at the second end of the fastener wherein squeezing of the first handle pivots the first and second members about the first fulcrum to open the jaws against closing bias provided by the biasing means and squeezing of the second handle pivots the first and second members about the second fulcrum to open the jaws against closing bias provided by the biasing means.

15 Claims, 11 Drawing Sheets

U.S. PATENT DOCUMENTS

| | | | | | |
|---|---|---|---|---|---|
| 2,573,125 | A | * | 10/1951 | Wilks | 24/511 |
| 2,615,221 | A | | 10/1952 | Linton | |
| 3,041,696 | A | * | 7/1962 | Ferri, Jr. | 24/566 |
| 3,084,410 | A | * | 4/1963 | Paul, Jr. | 24/507 |
| 3,137,906 | A | | 6/1964 | Roman | |
| 4,077,092 | A | * | 3/1978 | Basevi | 24/564 |
| 5,063,645 | A | | 11/1991 | Crespo | |
| 6,023,818 | A | * | 2/2000 | Shang | 24/501 |

FOREIGN PATENT DOCUMENTS

| | | |
|---|---|---|
| FR | 2 630 955 | 5/1988 |
| GB | 1021280 | 3/1966 |
| GB | 2331787 A | 6/1999 |
| GB | 2 351 521 | 1/2001 |
| WO | WO 94/18370 | 8/1994 |

* cited by examiner

DOUBLE ENDED PEG

FIELD OF THE INVENTION

The present invention relates to a fastener of a type suitable for use as a peg in fastening clothes or the like to a line.

BACKGROUND ART

Fasteners such as those suitable for use as pegs in fastening clothes or the like to a line are known to include two elongate members and a spring mechanism with a fastening portion or jaws at one end of the peg and an operating portion or handle at the other end of the peg. Such fasteners are often stored in a bucket or box or similar container and when required, a user will pull one out of the container to use in the known manner. It is often the case that the peg is pulled out 'upside-down' with the user holding the end with the jaws rather than the end with the handle, thereby requiring the fastener to be turned around. Depending on the user, this may require the use of two hands which can be troublesome, especially when the other hand is otherwise occupied holding what is to be fastened.

It would be an advancement in the art to provide a fastener that may be operable from either end.

The preceding discussion of the background to the invention is intended to facilitate an understanding of the present invention. However, it should be appreciated that the discussion is not an acknowledgement that any material referred to was part of the common general knowledge in Australia as at the priority date of the application.

DISCLOSURE OF THE INVENTION

In accordance with the present invention, there is provided a fastener with a first end and a second end, the fastener including a first member, a second member and biasing means, at least a first portion of the basing means being substantially parallel to at least a portion of the first member and at least a second portion of the basing means being substantially parallel to the at least a portion of the second member, the first and second members relatively pivotable at a first fulcrum intermediate the first and second ends and at a second fulcrum intermediate the first and second ends wherein the first fulcrum and the second fulcrum are spaced apart relative to each other, jaws located between the first fulcrum and the second fulcrum, a first handle at the first end of the fastener and a second handle at the second end of the fastener wherein squeezing of the first handle pivots the first and second members about the first fulcrum to open the jaws against closing bias provided by the biasing means and squeezing of the second handle pivots the first and second members about the second fulcrum to open the jaws against closing bias provided by the biasing means.

Advantageously, the fastener of the present invention is operable from either the first end or the second end.

When not in use, biasing means biases the first and second members against each other and maintains the jaws shut.

Preferably, the first and second members are elongate, each member having two end portions and an intermediate portion.

Preferably, the first and second members are identical.

Preferably, the fulcra are provided integrally with one or both members. In one form of the invention, the fulcra comprise a plurality of arcuate discs arranged longitudinally and substantially normally to the member on which the discs are provided. Preferably, each member comprises at least one disc. Preferably, every disc in a member engages a complementary arcuate recess in the opposing member.

In one form of the invention, the biasing means includes a length of flexibly resilient material curved on itself at two places along its length to provide an S-shaped spring. Preferably, the flexibly resilient material is provided in the form of a elongate member. The elongate member may be provided in the form of a substantially flat member or a wire.

Where the biasing means is provided in the form of an S-shaped spring, the biasing means preferably comprises a first end portion, a central portion and a second end portion wherein the first end portion and the central portion are interposed by a first curved portion and the central portion and the second end portion are interposed by a second curved portion. Without being limited by theory, it is believed that the first curved portion and the second curved portion provide the biasing force of the biasing means.

When the fastener is not in use, the first end portion, the central portion and the second end portion of the biasing means are substantially parallel.

In one form of the invention, the central portion of the biasing means is thinner than the first and second end portions of the biasing means.

In one form of the invention, the first and second curved portions of the biasing means are thinner than the first and second end portions of the biasing means.

Preferably, the first end portion, the central portion and the second end portion of the biasing means are all substantially linear. Preferably, the first end portion, the central portion and the second end portion of the biasing means are approximately the same length.

Preferably, each member is provided with an inner surface and an outer surface and an aperture, the aperture being in communication with the inner surface and the outer surface, and being dimensioned to receive a portion of the biasing means.

The aperture is preferably adjacent the at least one arcuate disc in the same member.

Preferably, each aperture is adjacent a fulcrum enabling the each curved portion of the biasing means to be adjacent a respective fulcrum.

Preferably, each member is provided with a recess in the outer surface of each member, adapted to receive a portion of the biasing means.

The recess in the first member is preferably adapted to receive the first end portion of the biasing means and recess in the second member is preferably adapted to receive the second end portion of the biasing means.

Each member is preferably provided with a locating element, adapted to engage the biasing means to facilitate the attachment of the biasing means to each member.

Where each member is provided with a locating element, the biasing means is provided with at least one complimentary receiving element. Preferably, each member is provided with a locating element and the biasing means is provided with two receiving elements, each receiving element adapted to receive a locating element on a member. In one form of the invention, the locating element is provided in the form of a protrusion extending from the outer surface of the member and the at least one receiving element is provided in the form of an aperture in the biasing means. In a second form of the invention, the locating element is provided in the form of a protrusion extending from the outer surface of the member and the at least one receiving element is provided in the form of a notch in the biasing means.

Preferably, each member is provided with securing means to facilitate the securing of the biasing means in the respective recess.

Preferably, the outer surface of each member is concave. Advantageously, the concave shape of the outer surface increases the inner angle of each handle, the inner angle being the angle between the inner surfaces of each member forming the handle, the increase in inner angle enabling the fastener to be opened to accommodate larger items than a fastener with a smaller inner angle.

The biasing means should be flexibly resilient and provide sufficient biasing force to releasably secure an article of clothing to a line. Preferably, the biasing means is prepared from material with high mechanical strength and rigidity and good dimensional stability. In one form of the invention, it may be provided as a thermoplastic polymer such as acetal. Elements such as glass may be added to improve stiffness to required levels. In an alternate from of the invention, the biasing means may be metal.

BRIEF DESCRIPTION OF THE DRAWINGS

The present invention will now be described, by way of example only, with reference to two embodiments thereof and the accompanying drawings, in which:—

BEST MODE(S) FOR CARRYING OUT THE INVENTION

Those skilled in the art will appreciate that the invention described herein is amenable to variations and modifications other than those specifically described. It is to be understood that the invention includes all such variations and modifications. The invention also includes all of the steps, features, compositions and compounds referred to or indicated in the specification, individually or collectively and any and all combinations or any two or more of the steps or features.

The fastener of the present invention may be provided in the form of a clothes peg and by way of example, will be referred to as such in the following description. However, it is to be understood that the fastener of the present invention may be used in other applications such as releasably holding a number of sheets of material together. Alternatively, the fastener of the present invention could be used to releasably secure two adjacent sheets of material together to in effect, create a larger sheet.

Figure 1:
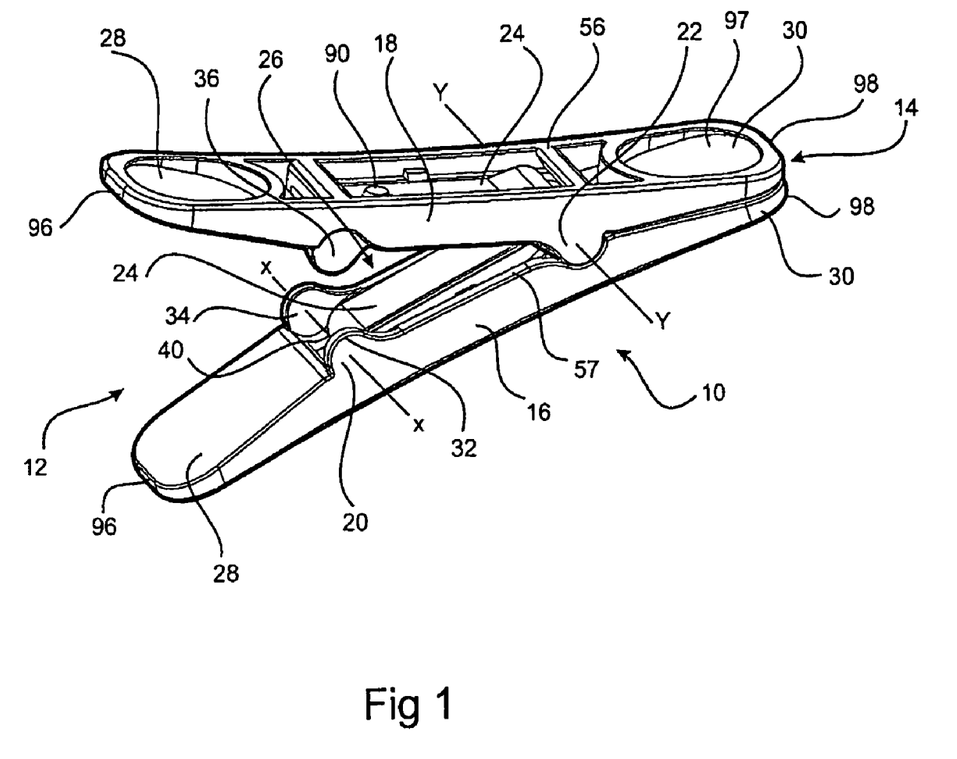
FIG. 1 is an upper perspective view of a fastener in accordance with a first embodiment of the present invention.
Figure 2:
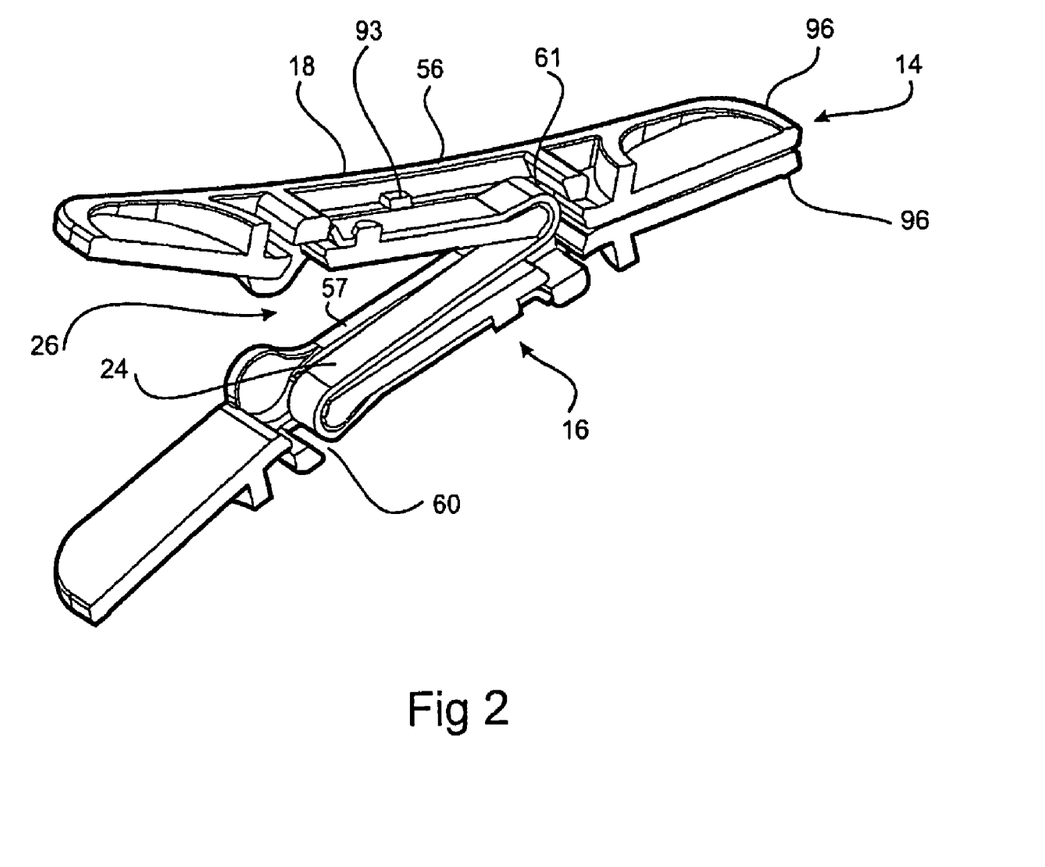
FIG. 2 is an upper perspective cut-away view of the fastener of FIG. 1.
Figure 3:
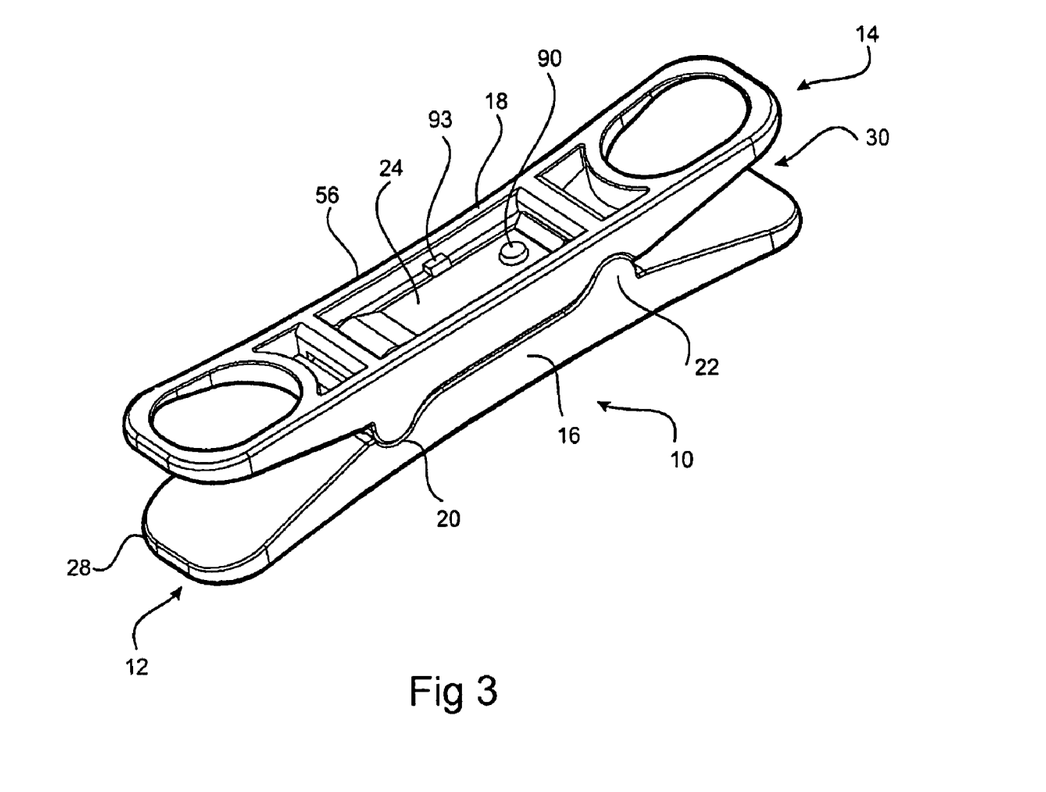
FIG. 3 is an alternate upper perspective view of the fastener of FIG. 1.

In FIGS. 1 to 7 there is shown a fastener 10 in accordance with a first embodiment of the present invention, the fastener 10 comprising a first end 12 and a second end 14. The fastener 10 includes a first member 16 and a second member 18, a first fulcrum 20 and a second fulcrum 22 and a biasing means 24. Jaws 26 are provided between the first fulcrum 20 and the second fulcrum 22. A first handle 28 is provided at the first end 12 and a second handle 30 is provided at the second end 14. As best seen in FIG. 2, first member 16 and second member 18 are identical in shape.

The first fulcrum 20 includes three arcuate discs 32, 34, 36 arranged longitudinally and substantially normally to the first member 16 and the second member 18. Alternate discs are provided on the first member 16 and second member 18 with discs 32 and 36 being provided on the first member 16 and disc 34 being provided on the second member 18. Each disc 32, 34, 36 engages a respective complementary recess 38, 40, 42 in the opposing member such that the first member 16 and the second member 18 may pivot thereabout on a pivot axis X-X through the centre of curvature of the outer periphery of each disc 32, 34, 36 and of each complementary arcuate recess 38, 40, 42.

The second fulcrum 22 includes three arcuate discs 44, 46, 48 arranged longitudinally and substantially normally to the first member 16 and the second member 18. The three arcuate discs 44, 46, 48 of the second fulcrum 22 are identical to the three arcuate discs 32, 34, 36 of the first fulcrum 20. Alternate discs are provided on the first member 16 and second member 18 with discs 44 and 48 being provided on the second member 18 and disc 46 being provided on the first member 16. Each disc 44, 46, 48 engages a respective complementary recess 50, 52, 54 in the opposing member such that the first member 16 and the second member 18 may pivot thereabout on a pivot axis Y-Y through the centre of curvature of the outer periphery of each disc 44, 46, 48 and of each complementary arcuate recess 50, 52, 54.

The first member 16 and the second member 18 are each provided with an outer surface 56 and an inner surface 57 and longitudinal recesses 58 extend along the outer surface 56 of the first member 16 and the outer surface 56 of the second member 18. The recesses 58 are situated between the first fulcrum 20 and the second fulcrum 22 and are dimensioned to receive the biasing means 24.

Figure 4:
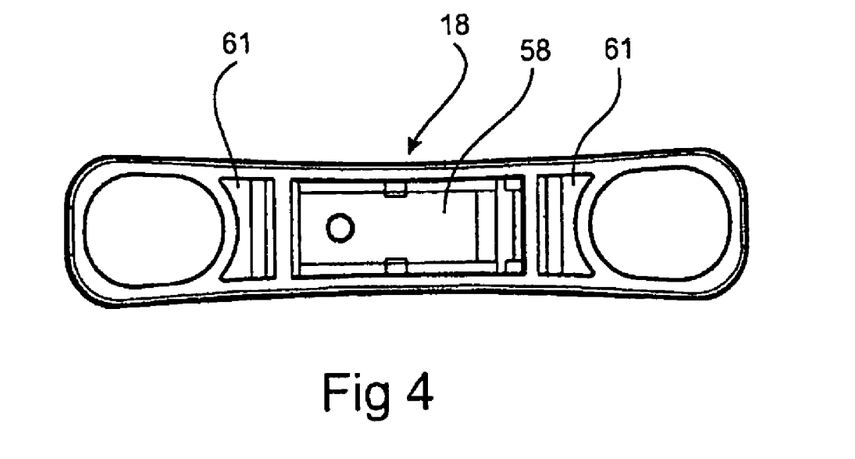
FIG. 4 is an upper plan view of a member of the fastener of FIG. 1.
Figure 5:
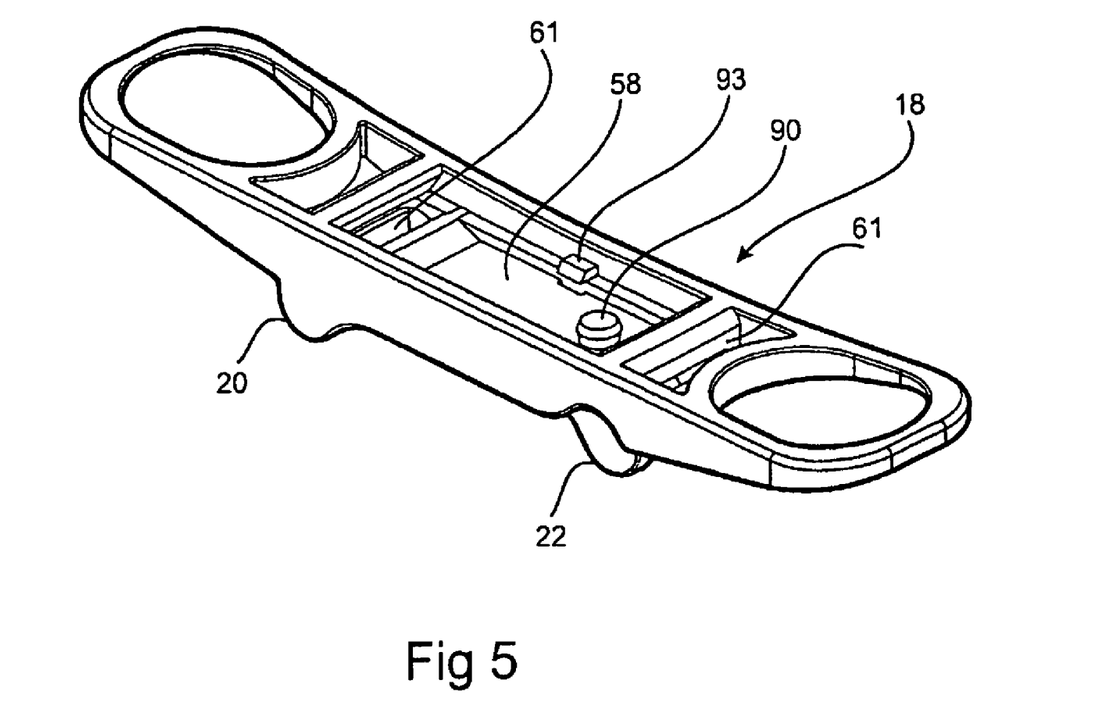
FIG. 5 is an upper perspective view of the member of FIG. 4.

An aperture 60 is provided through the first member 16 and an aperture 61 is provided through the second member 18. Each aperture 60, 61 is aligned with a recess 58.

Figure 6:
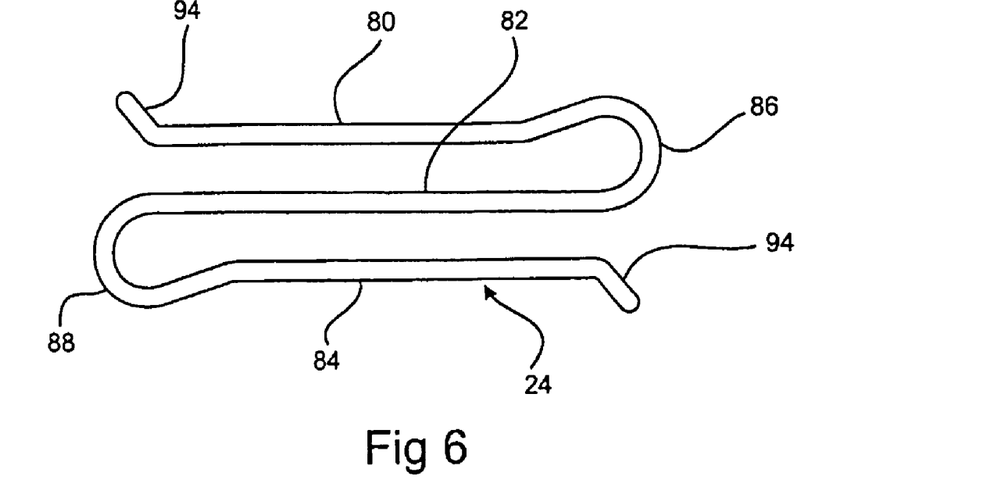
FIG. 6 is a side view of the biasing means of the fastener of FIG. 1.
Figure 7:
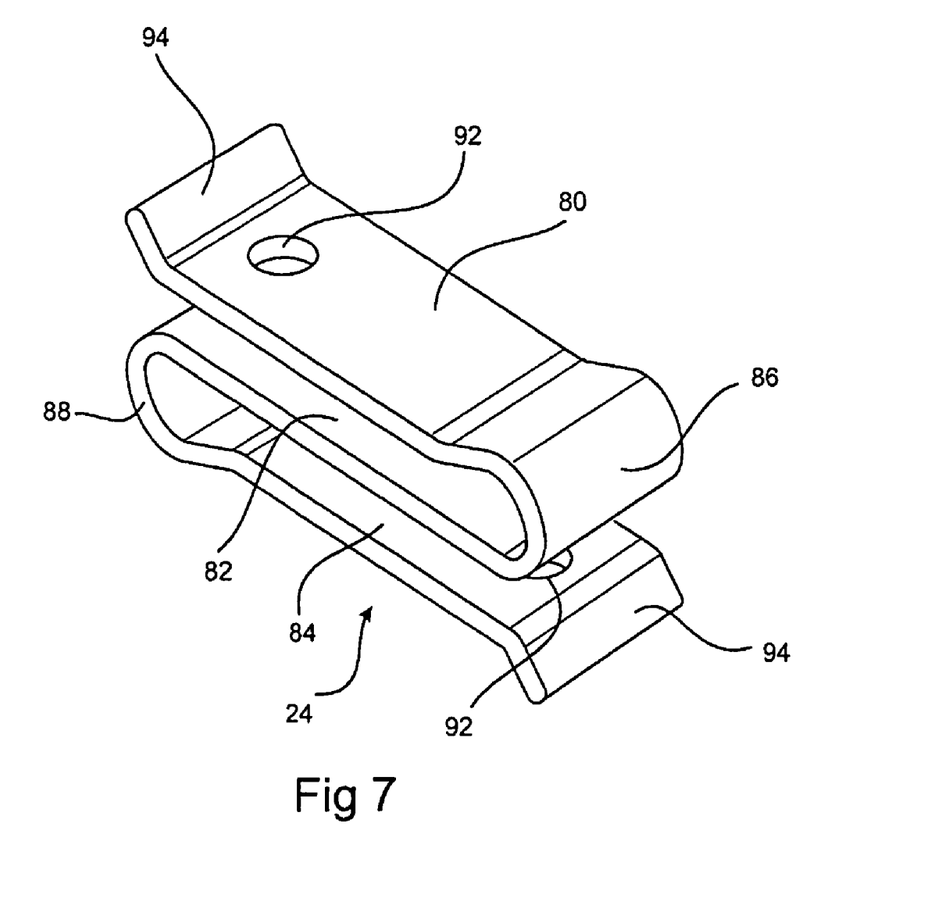
FIG. 7 is an upper perspective view of the biasing means of FIG. 6.

The biasing means 24 is provided in the form of a length of flexibly resilient substantially flat material curved on itself at two places along its length to provide three straight portions a first end portion 80, a central portion 82 and a second end portion 84, interposed by two curved portions, a first curved portion 86 and a second curved portion 88, wherein the first end portion 80 and the central portion 82 are interposed by the first curved portion 86, and the central portion 82 and the second end portion 84 are interposed by the second curved portion 88 thereby providing an S-shaped spring, best seen in FIGS. 6 and 7.

When the fastener 10 is not in use, the first end portion 80, the central portion 82 and the second end portion 84 of the biasing means 24 are substantially parallel, best seen in FIG. 6. When the fastener 10 is not in use, the first end portion 80 is substantially parallel with the first member 16 and the second end portion 84 is substantially parallel with the second member 18.

Each member 16, 18 is provided with a locating element in the form of a protrusion 90 in the recess 58 and the straight portions 80, 84 of the biasing means 24 are each provided with a receiving element in the form of an aperture 92. Each protrusion 90 is adapted to engage a complimentary aperture 92 to facilitate the attachment of the biasing means 24 to each member 16, 18.

Each member 16, 18 is provided with securing means 93 to facilitate the securement of the biasing means 24 in the recess 58 against lateral movement.

To assemble the fastener 10, a first straight portion 80 of the biasing means 24 is inserted through the aperture 60 in the first member 16 and the straight portion 80 aligned with the recess 58 such that the protrusion 90 engages the aperture 92. A third straight portion 84 is inserted through the aperture 61 in the second member and the straight portion 84 aligned with the recess 58 such that the protrusion 90 engages the aperture 92.

To assist assembly of the fastener 10, the first end portion 80 and the second end portion 84 of the biasing means 24 are each provided with an inclined leading edge in the form of a flange 94.

In use, a user (not shown) applies force to the first handle 28 by gripping and squeezing the handle elements 96 towards each other as shown in FIG. 1. As the first 16 and second 18 members pivot about the fulcrum 20, the jaws 26 open against the biasing force of the biasing means 24. If force is applied to the second handle 30 and the handle elements 98 are squeezed together, the first member 16 and the second member 18 will pivot about the fulcrum 22, thereby opening the jaws 26. Advantageously, the biasing means 24 as described with reference to the preferred embodiment provides jaws 26 with greater depth than a fastener with a biasing means mounted in the centre of each member.

The positioning of the first curved portion 86 adjacent the first fulcrum 20 and the second curved portion 88 adjacent the second fulcrum 22 advantageously increases the amount of biasing forces applied by the fastener when in use.

The structure of the fastener 10 is maintained against any transverse forces as the arcuate discs 32, 36, provided integrally with the first member 16 bear against the arcuate disc 34 provided integrally with the second member 18 and the arcuate disc 46 provided integrally with the first member 16 bear against the arcuate discs 44, 48 provided integrally with the second member 18.

The biasing means should be flexibly resilient and provide sufficient biasing force to releasably secure an article of clothing to a line. Preferably, the biasing means is prepared from material with high mechanical strength and rigidity and good dimensional stability. In one form of the invention, it may be provided as a thermoplastic polymer such as acetal. Elements such as glass may be added to achieve required levels of stiffness. In an alternate from of the invention, the biasing means may be metal.

To decrease material consumption, material may be removed from the handles 28, 30 to provide recesses 97. Advantageously, the recesses may also function as gripping portions for fingers.

The first and second members should be sufficiently resilient to reduce undesirable lateral bending when in use. Polypropylene may be used to prepare the members although those skilled in the art will appreciate that other materials may be used.

Figure 11:
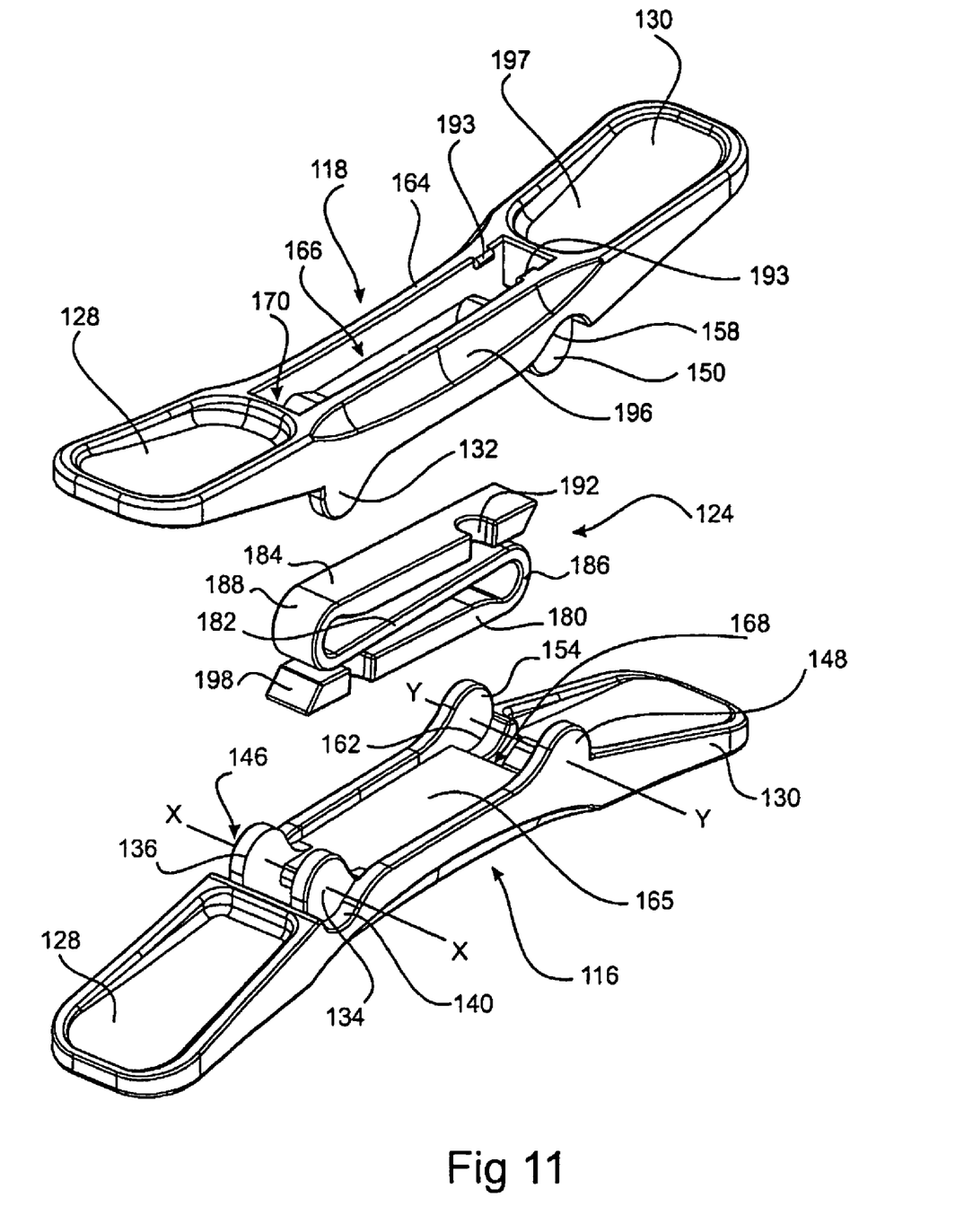
FIG. 11 is an exploded upper perspective view of the fastener of FIG. 8.
Figure 12:
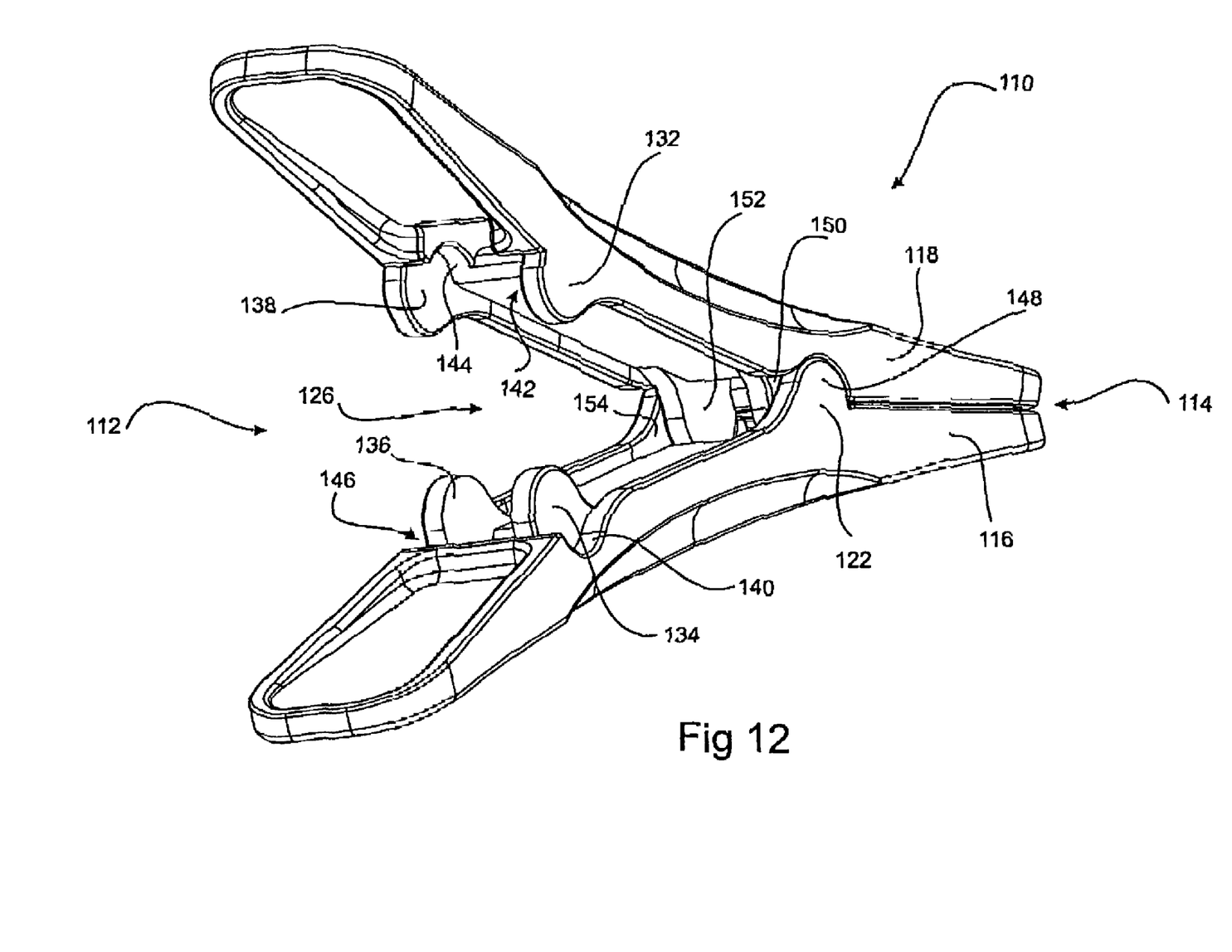
FIG. 12 is an alternate perspective view of the fastener of FIG. 8.
Figure 13:
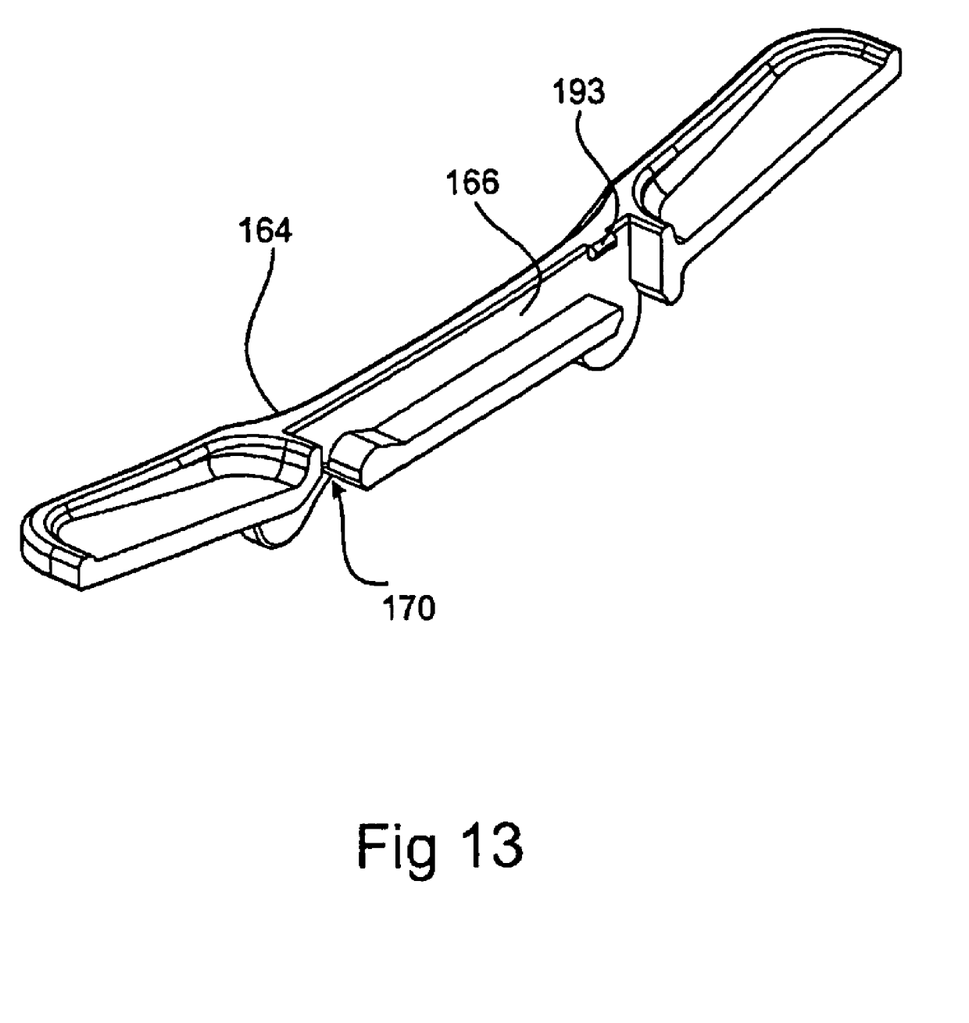
FIG. 13 is an upper perspective cut-away view of the fastener of FIG. 8.

In FIGS. 8 to 16 there is shown a fastener 110 in accordance with a second embodiment of the present invention. The fastener 110 comprises a first end 112 and a second end 114. The fastener 110 includes a first member 116 and a second member 118, a first fulcrum 120 and a second fulcrum 122 and a biasing means 124. Jaws 126 are provided between the first fulcrum 120 and the second fulcrum 122. A first handle 128 is provided at the first end 112 and a second handle 130 is provided at the second end 114. As best seen in FIG. 11, first member 16 and second member 18 are identical in shape.

The first fulcrum 120 includes four arcuate discs 132, 134, 136, 138 arranged longitudinally and substantially normally to the first member 116 and the second member 118. Each disc 132, 134, 136, 138 engages a respective complementary recess 140, 142, 144, 146 in the opposing member such that the first member 116 and the second member 118 may pivot thereabout on a pivot axis X-X through the centre of curvature of the outer periphery of each disc 132, 134, 136, 138 and of each complementary arcuate recess 140, 142, 144, 146.

The second fulcrum 122 includes four arcuate discs 148, 150, 152, 154 arranged longitudinally and substantially normally to the first member 116 and the second member 118. Each disc 148, 150, 152, 154 engages a respective complementary recess 156, 158, 160, 162 in the opposing member such that the first member 116 and the second member 118 may pivot thereabout on a pivot axis Y-Y through the centre of curvature of the outer periphery of each disc 148, 150, 152, 154 and of each complementary arcuate recess 156, 158, 160, 162.

The first member 116 and the second member 118 are each provided with an outer surface 164 and an inner surface 165 and longitudinal recesses 166 extend along the outer surface 164 of the first member 116 and the outer surface 164 of the second member 118. The recesses 166 are situated between the first fulcrum 120 and the second fulcrum 122 and are dimensioned to receive the biasing means 124.

An aperture 168 is provided through the first member 116 and an aperture 170 is provided through the second member 118. Each aperture 168, 170 is aligned with a recess 164.

The biasing means 124 is provided in the form of a length of flexibly resilient substantially flat material curved on itself at two places along its length to provide three straight portions a first end portion 180, a central portion 182 and a second end portion 184, interposed by two curved portions, a first curved portion 186 and a second curved portion 188, wherein the first end portion 180 and the central portion 182 are interposed by the first curved portion 186, and the central portion 182 and the second end portion 184 are interposed by the second curved portion 188 thereby providing an S-shaped spring, best seen in FIGS. 11 and 14 to 16.

Figure 16:
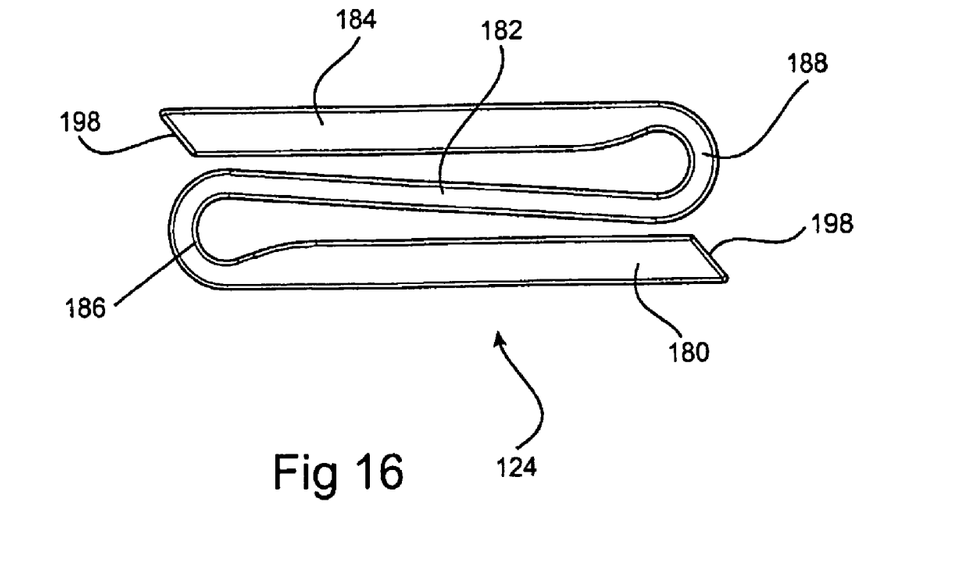
FIG. 16 is side view of the biasing means of the fastener of FIG. 8.

When the fastener 110 is not in use, the first end portion 180, the central portion 182 and the second end portion 184 of the biasing means 124 are substantially parallel, best seen in FIG. 16. When the fastener 10 is not in use, the first end portion 180 is substantially parallel with the first member 116 and the second end portion 184 is substantially parallel with the second member 118.

Each member 116, 118 is provided with a locating element in the form of a protrusion 190 in the recess 158 and the straight portions 180, 184 of the biasing means 124 are each provided with a receiving element in the form of an notch 192. Each protrusion 190 is adapted to engage a complimentary notch 192 to facilitate the attachment of the biasing means 124 to each member 116, 118. Each member 116, 118 is provided with securing means 193 to facilitate the securement of the biasing means 124 in the recess 158 against lateral movement.

Figure 14:
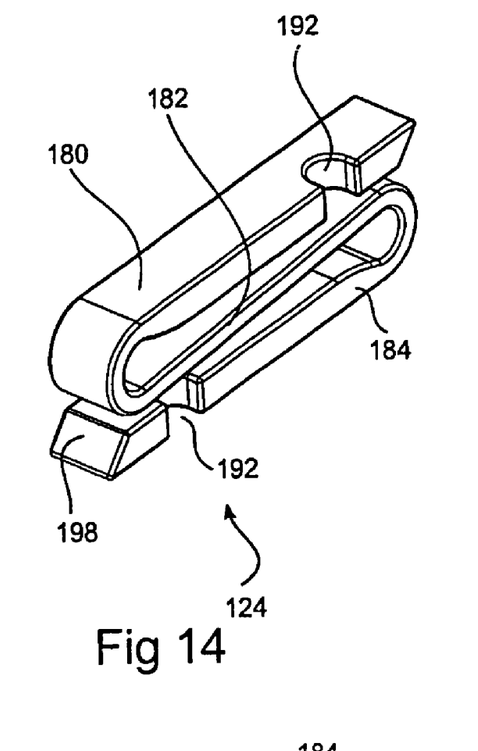
FIG. 14 is a s first upper perspective view of the biasing means of the fastener of FIG. 8.
Figure 15:
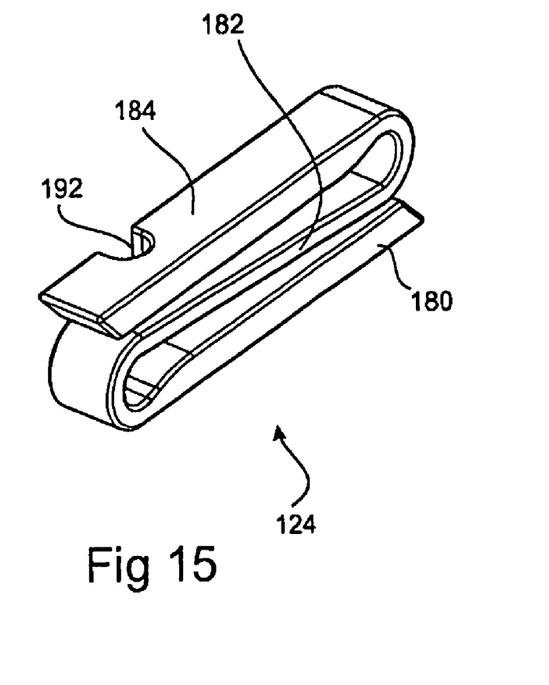
FIG. 15 is second upper perspective view of the biasing means of the fastener of FIG. 8.

The central portion 182 of the biasing means 124 is thinner than the first 180 and second 184 end portions of the biasing means 124. The first 186 and second 188 curved portions of the biasing means 124 are thinner than the first 180 and second 184 end portions of the biasing means 124.

Figure 8:
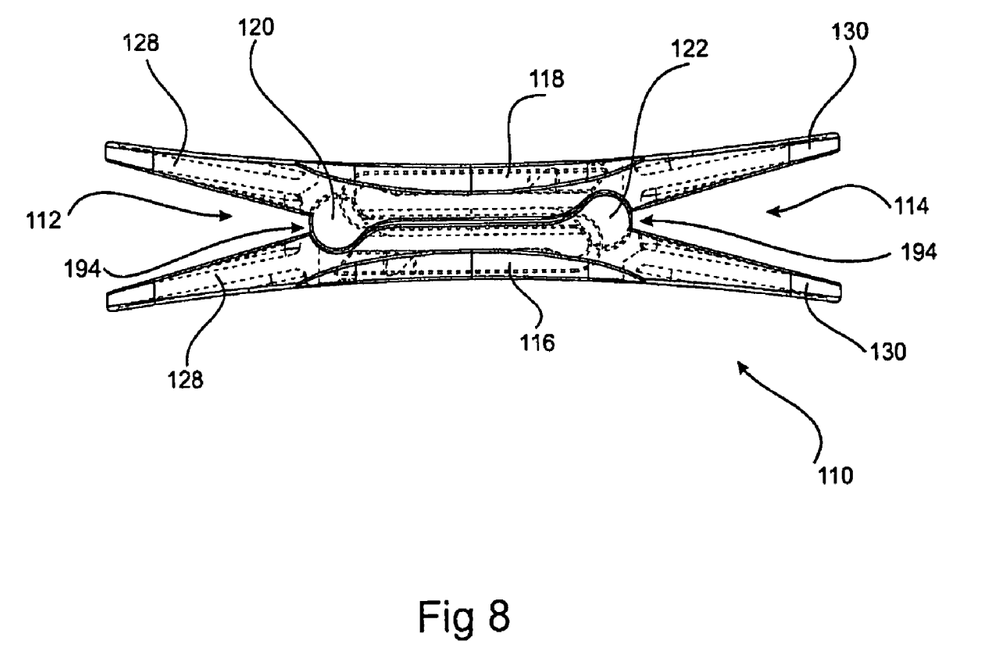
FIG. 8 is a side view of a fastener in accordance with a second embodiment of the present invention.
Figure 9:
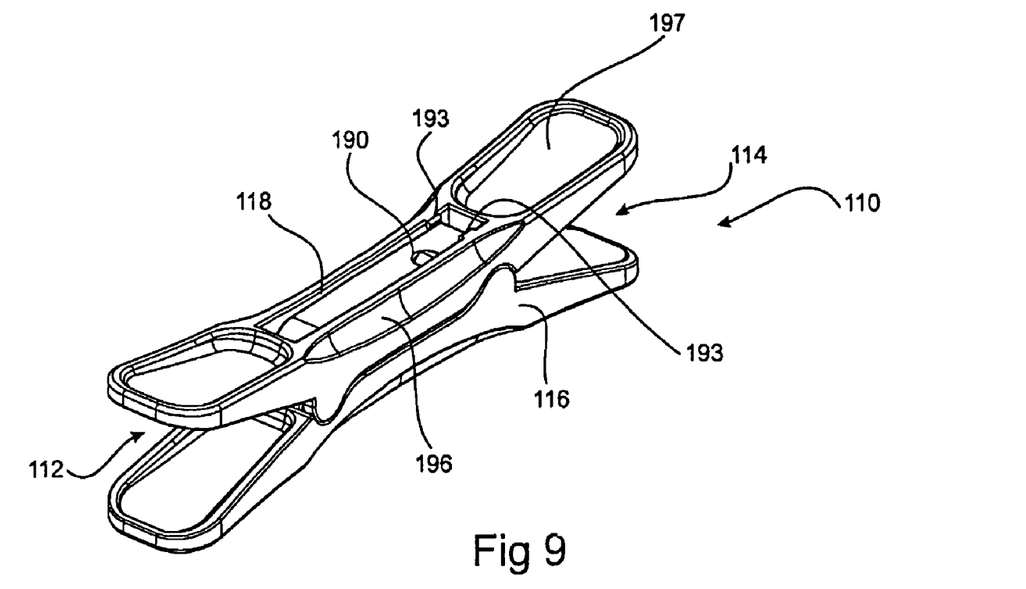
FIG. 9 is a first upper perspective view of the fastener of FIG. 8.
Figure 10:
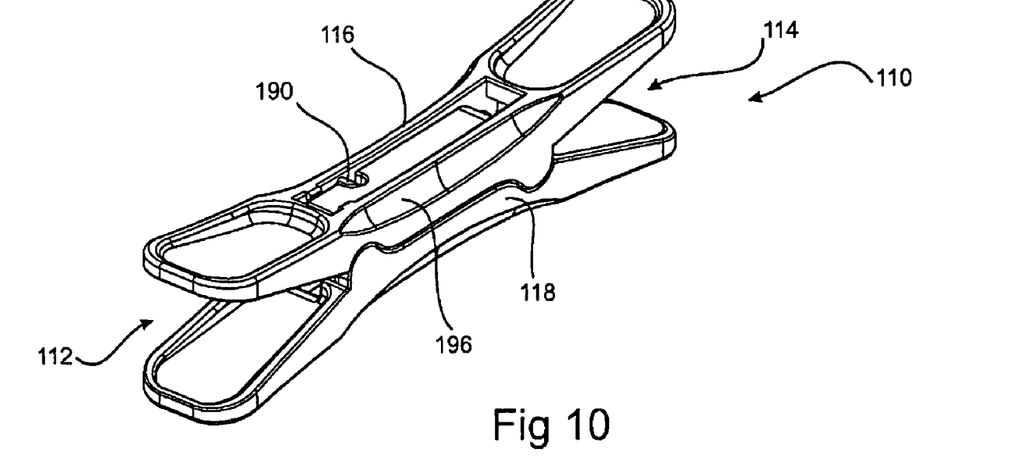
FIG. 10 is a second upper perspective view of the fastener of FIG. 8.

The outer surface 164 of each member 116, 118 is concave, best seen in FIG. 8. Advantageously, the concave profile of the outer surface 164 increases the inner angle 194 of each handle 128, 130, the inner angle 194 being the angle between the inner surfaces 165 of each member forming the handle, the increase in inner angle 194 enabling the fastener 110 to be opened to accommodate larger items than a fastener with a smaller inner angle.

Portions of the outer surface 164 such as the shoulders 196 may be removed to decrease material consumption and to increase strength of the members 116, 118. To further decrease material consumption, material may be removed from the handles 128, 130 to provide recesses 197. Advantageously, the recesses may also function as gripping portions for fingers.

To assemble the fastener 110, the first straight portion 180 of the biasing means 124 is inserted through the aperture 168 in the first member 116 and the straight portion 180 aligned with the recess 164 such that the protrusion 192 engages the aperture 190. A third straight portion 184 is inserted through the aperture 170 in the second member 118 and the straight portion 184 aligned with the recess 164 such that the protrusion 192 engages the aperture 190.

To assist assembly of the fastener 10, the first end portion 80 and the second end portion 84 of the biasing means 24 are each provided with an inclined leading edge in the form of a bevelled edge 198.

The invention claimed is:

1. A fastener with a first end and a second end, the fastener including
   a first member,
   a second member, and
   biasing means, wherein the biasing means includes a length of flexibly resilient material curved on itself at two places along its length to provide an S-shaped spring comprising a first end portion, a central portion and a second end portion wherein the first end portion and the central portion are interposed by a first curved portion and the central portion and the second end portion are interposed by a second curved portion, and wherein at least a first portion of the biasing means is substantially parallel to at least a portion of the first member and at least a second portion of the biasing means is substantially parallel to the at least a portion of the second member, the first and second members being relatively pivotable at a first fulcrum intermediate the first and second ends and a second fulcrum intermediate the first and second ends, wherein the first fulcrum and the second fulcrum are spaced apart relative to each other,
   jaws located between the first fulcrum and the second fulcrum,
   a first handle at the first end of the fastener, and
   a second handle at the second end of the fastener, wherein squeezing of the first handle pivots the first and second members about the first fulcrum to open the jaws against closing bias provided by the biasing means and squeezing of the second handle pivots the first and second members about the second fulcrum to open the jaws against closing bias provided by the biasing means; wherein the central portion of the biasing means is displaced within the fastener and forms part of the jaws; wherein each member is provided with a locating element, adapted to engage the biasing means to facilitate the attachment of the biasing means to each member; wherein the biasing means is provided with at least one receiving element, the or each receiving element adapted to receive the locating element on a member; and wherein at least one locating element is provided in the form of a protrusion extending from an outer surface of the member and the at least one receiving element is provided in the form of an aperture in the biasing means.

2. A fastener according to claim 1, wherein the first and second members are elongate, each member having two end portions and an intermediate portion.

3. A fastener according to claim 1, wherein the first and second members are identical.

4. A fastener according to claim 1, wherein the fulcra are provided integrally with one or both members.

5. A fastener according to claim 1, wherein the fulcra comprise a plurality of arcuate discs arranged longitudinally and substantially normally to the member on which the discs are provided.

6. A fastener according to claim 5, wherein each member comprises at least one disc.

7. A fastener according to claim 5, wherein every disc in a member engages a complementary arcuate recess in the opposing member.

8. A fastener according to claim 1, wherein the flexibly resilient material is provided in the form of a substantially flat elongate member or a wire.

9. A fastener according to claim 1, wherein the first end portion, the central portion and the second end portion of the biasing means are substantially parallel when the fastener is not in use.

10. A fastener according to claim 1, wherein each member is provided with an inner surface and an outer surface and an aperture, the aperture being in communication with the inner surface and the outer surface, and being dimensioned to receive a portion of the biasing means.

11. A fastener according to claim 10, wherein each member is provided with a recess in the outer surface of each member, adapted to receive a portion of the biasing means.

12. A fastener according to claim 11, wherein the recess in the first member is adapted to receive the first end portion of the biasing means and the recess in the second member is adapted to receive the second end portion of the biasing means.

13. A fastener according to claim 10, wherein the outer surface of each member is concave.

14. A fastener according to claim 1, wherein the locating element is provided in the form of a protrusion extending from an outer surface of the member and the at least one receiving element is provided in the form of a notch in the biasing means.

15. A fastener according to claim 1, wherein the aperture in the at least one receiving element is provided in the form of a notch in the biasing means.

* * * * *